United States Patent
Raasch

(12) 
(10) Patent No.: US 6,303,863 B1
(45) Date of Patent: *Oct. 16, 2001

(54) RAPID ATTACHMENT COVER FOR UTILITY POLE ACCESS OPENING

(76) Inventor: Jason J. Raasch, 2111 N. Burke Dr., Arlington Heights, IL (US) 60004

(*) Notice: Subject to any disclaimer, the term of this patent is extended or adjusted under 35 U.S.C. 154(b) by 0 days.

This patent is subject to a terminal disclaimer.

(21) Appl. No.: 09/535,808

(22) Filed: Mar. 28, 2000

Related U.S. Application Data

(60) Division of application No. 09/054,638, filed on Apr. 3, 1998, now Pat. No. 6,064,005, which is a continuation-in-part of application No. 08/949,545, filed on Oct. 14, 1997, now abandoned.

(51) Int. Cl.[7] ...................................... H02G 3/14
(52) U.S. Cl. .............................. 174/66; 220/241; 220/3.8
(58) Field of Search ................. 174/66, 67; 240/241; 220/3.8, 3.5

(56) References Cited

U.S. PATENT DOCUMENTS

| | | |
|---|---|---|
| 291,771 | 1/1884 | Rasgorshek . |
| 345,073 | 7/1886 | Phillips . |
| 1,846,400 | 2/1932 | MacFarlane . |
| 2,014,444 | 9/1935 | Miller . |
| 2,179,198 | 11/1939 | Reed . |
| 2,422,420 | 6/1947 | Judd . |
| 3,320,601 | 5/1967 | Yankus . |
| 3,343,322 | 9/1967 | Lurkis et al. . |
| 3,755,977 | 9/1973 | Lewis . |
| 4,914,258 | 4/1990 | Jackson . |
| 5,120,168 | 6/1992 | Padula . |
| 5,598,753 | 2/1997 | Lee . |
| 5,641,939 | 6/1997 | Tourigny . |
| 5,651,651 | 7/1997 | Spencer . |
| 5,927,747 | 7/1999 | Farrington . |
| 5,953,842 | 9/1999 | Bodell . |
| 6,064,005 | * 5/2000 | Raasch .................................. 174/66 |

FOREIGN PATENT DOCUMENTS

289825 * 6/1965 (NL) .

* cited by examiner

Primary Examiner—Dean A. Reichard
Assistant Examiner—Angel R. Estrada
(74) Attorney, Agent, or Firm—Greer, Burns & Crain, Lt

(57) ABSTRACT

An access cover assembly for use in removably covering an access opening of a utility pole, the opening having a width, a height which is longer than the width and a pair of side edges; the assembly includes a cover having edges configured for engaging the pole, being provided in a sufficient size to cover the opening, and a claw tool having a central portion and a pair of opposing ends, the central portion having a fastener chamber for lockingly engaging a threaded fastener, the fastener chamber constructed and arranged so that the fastener may be pushed axially into the chamber and held there to secure the cover to the pole to cover the opening, and so that the fastener may be removed by unthreading.

7 Claims, 4 Drawing Sheets

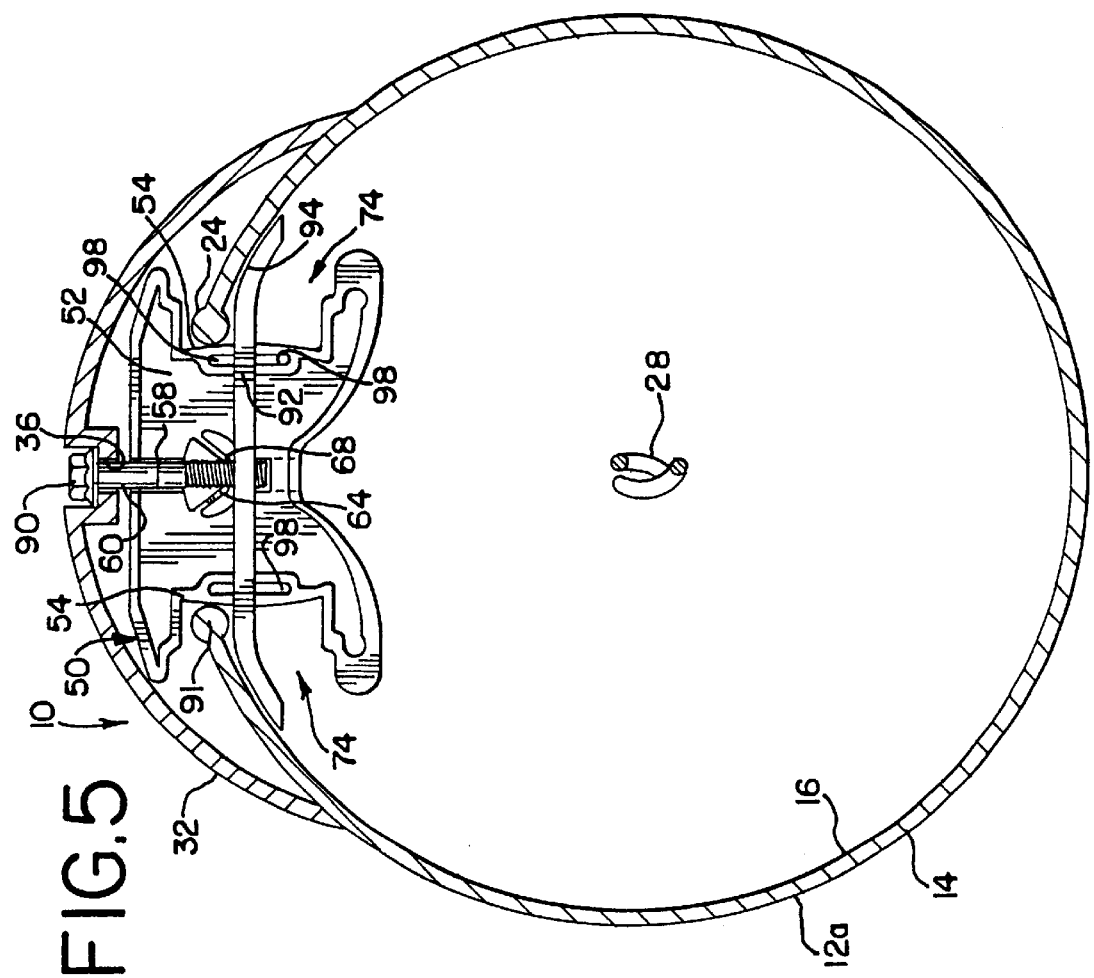

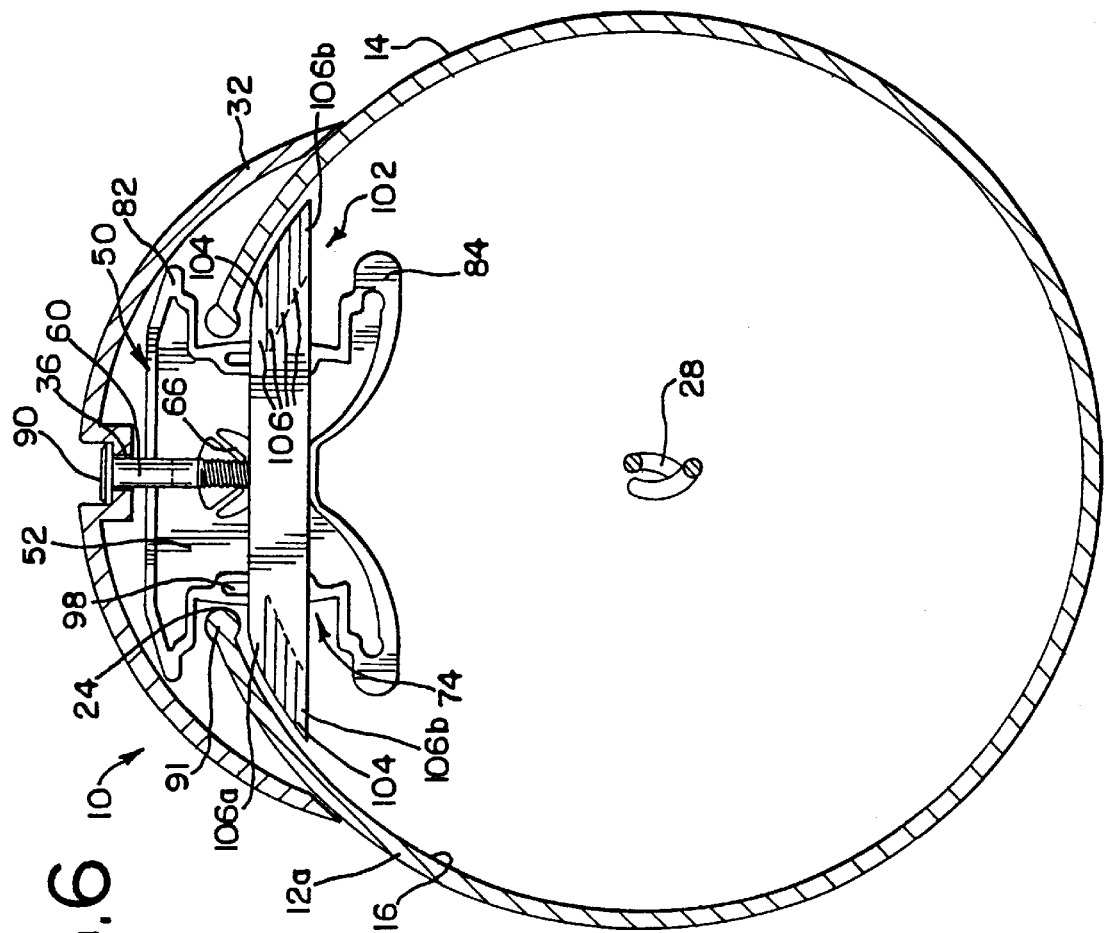
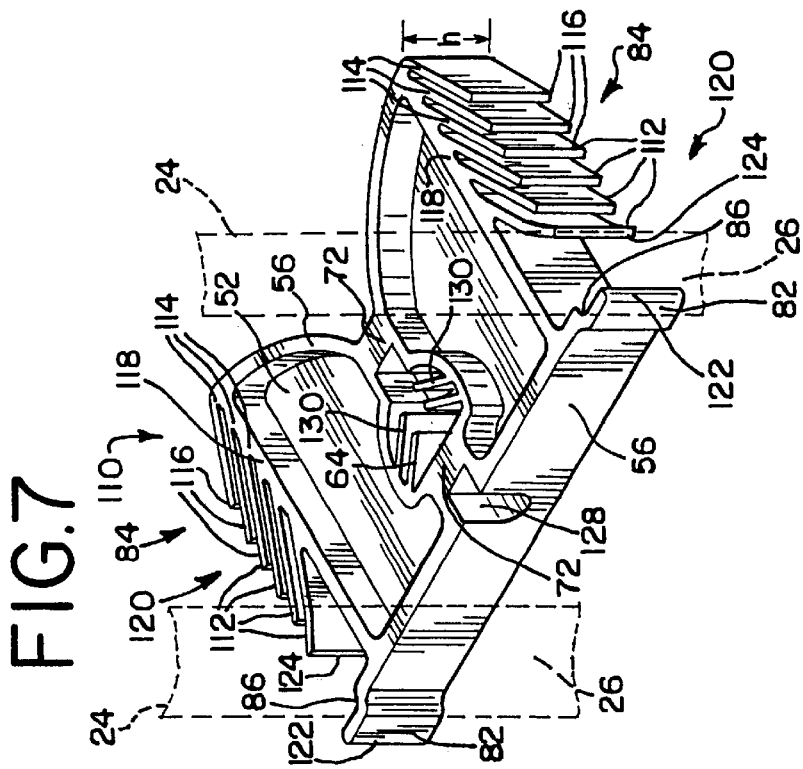

RAPID ATTACHMENT COVER FOR UTILITY POLE ACCESS OPENING

RELATED APPLICATION

This application is a continuation-in-part of U.S. patent application Ser. No. 08/949,545 filed Oct. 14, 1997. now abandoned.

This is a divisional of application Ser. No. 09/054,638, filed Apr. 3, 1998, now U.S. Pat. No. 6,064,005.

BACKGROUND OF THE INVENTION

The present invention relates generally to a replacement cover for the access opening typically found near the base of utility poles, and particularly to a replacement cover which is rapidly assembled onto the pole without the need for tools.

Conventional utility poles are generally cylindrical, hollow poles, often made of aluminum, which gradually taper from a strengthened base to a top. The base is fastened to a concrete foundation, through which wires are passed for powering the light fixture located at the top of the pole.

Such poles typically are provided with an access opening in the side of the pole near the base for servicing the electrical wiring. In most cases, the access openings are generally taller than wide, and have an elliptical, oval or rectangular perimeter. In some cases, the access openings have thickened edges or flanges for supporting a removable cover for the opening. The cover is typically secured to the pole by threaded fasteners.

For various reasons, these access opening covers have become the targets of vandals. In some cases, the typically aluminum covers are stolen for their scrap value. In other cases, the covers are removed so that the vandals can obtain access to the electrical power passing through the wires. In still other cases, the vandals merely want to cut the wires to disable the light for the furtherance of other criminal activity.

Once the covers are removed, the utility service personnel must find a replacement, which is often difficult since the openings come in various sizes, depending on the manufacturer and vintage of the pole. While the pole is coverless, individuals may become injured by contact with the exposed wires. Another disadvantage of conventional access opening covers is that, in cases where the cover is present and the pole needs servicing, the screws securing the cover to the pole become rusted and are difficult to remove from the pole. Upon installation of a replacement cover, the installer must be careful to avoid shorting out the wires with the metal hardware used to mount the replacement cover.

One attempt at providing a universal access opening cover is disclosed in U.S. Pat. No. 4,914,258. In that patent, the replacement assembly includes a cover shell fitting over the opening, a flat steel retaining bar which fits inside the pole, and a threaded fastener which passes through an opening in the shell and is threadably received in the bar. A major disadvantage of this type of replacement kit is that, because of the bar length and poor positioning characteristics, the threaded fastener must be relatively long and includes a relatively long threaded portion. This structure means that the installer, in many applications, will have to laboriously thread a major portion of the fastener into the bar. In commercial embodiments of this device, assembly of the bar requires two additional threaded bolts which have to be laboriously positioned, retained and tightened simultaneously. This is cumbersome (requiring tools and both hands) which is often difficult due to the proximity of the repair site to high speed traffic or inclement weather conditions (rain, ice, etc.).

Another related disadvantage is that the typically metallic bar and metallic fastener risk the chance of creating shorts in the wiring, particularly when the installer first inserts the bar through the access opening and into the interior of the pole, manipulating and positioning the bar amongst old, potentially exposed wiring. Often the wires become bunched or tangled near the access opening, and must be pushed down to receive the bar. Also, as the fastener is tightened, the tip portion may contact the wires, creating another source of short circuit or shock to the installer. Additionally, when the bar is tightened forward into position, it could pinch otherwise insulated wiring and actually create an exposed wire or a short circuit condition.

Still another disadvantage of the replacement cover disclosed in U.S. Pat. No. 4,914,258 is that when the cover or shell is secured to the pole, a waterproof seal is not achieved, and moisture collects inside the pole. Over time, this moisture accelerates the corrosion of the pole, its internal components and more importantly, the mounting bolts.

A still further disadvantage of conventional universal replacement utility pole covers is that they are unable to fit the variety of utility pole access openings. Some of these openings are bordered by deep, cowl-like edges, while others merely have a thickened bead around the opening. Replacement covers which fit the beaded-type openings do not always properly fit on the cowl-like edged openings, and vice versa.

Accordingly, it is a primary object of the present invention to provide an improved replacement utility pole access opening cover which is easily installed without the need for tools.

Another object of the present invention is to provide an improved replacement utility pole access opening cover which is made of non-conductive materials to avoid creating shocks or short circuits.

Yet another object of the present invention is to provide an improved replacement utility pole access opening cover which prevents corrosion of the utility pole and/or its internal components.

A further object of the present invention is to provide an improved replacement utility pole access opening cover including an insulated collection tool (or claw) which the installer can use to collect and safely push wiring back inside the pole.

A still further object of the present invention is to provide an improved replacement utility pole access opening cover which can be implemented with minimal disturbance to existing old wiring and without exerting a shearing action from the passing by and torquing of a sharp metal rod.

Still another object of the present invention is to provide an improved replacement utility pole access opening cover which does not have to be installed by an electrician.

It is also an object of the present invention to provide an improved replacement utility pole access opening cover which fits into a wide variety of utility pole access openings.

A still further object of the present invention is to provide an improved replacement utility pole access opening cover which optionally includes a tamper resistant locking feature to further protect the wiring inside the utility pole.

BRIEF SUMMARY OF THE INVENTION

The above-listed objects are met or exceeded by the present rapid attachment cover for a utility pole access opening. Included in the features of the present invention, which is provided as an assembly, is a quick connect ratchet-type attachment in which a claw tool fits in the access opening and is configured to receive a threaded fastener in a pushing motion, without the use of tools. Thus, the installer merely wedges the claw tool within the opening, inserts the fastener through an opening in a cover portion, and, upon engagement with an opening in the claw tool, merely presses the fastener in by hand until the cover seats tightly against the pole. The fastener may be removed in a conventional manner by unthreading.

In addition, to prevent short circuits and shocks to the installer, the claw tool, and even the fastener, are made of non-conductive plastic material. To increase the applicability of the present invention to a wider range of utility pole sizes, a plurality of gripping flaps may be provided to the claw tool, the flaps constructed and arranged to engage access openings of various sizes. In the alternative, a supplemental adapter may be provided which releasably snaps into the present claw tool. Another feature is that the cover is provided with an air vent for preventing corrosion of the utility pole and/or its internal components. Tamper resistant fasteners having specialized heads may be used to discourage unauthorized removal of the present covers.

More specifically, the present invention provides an access cover assembly for use in removably covering an access opening of a utility pole, the opening having a width, a length which is longer than the width and a pair of side edges. The assembly includes a cover having edges configured for engaging the pole, being provided in a sufficient size to cover the opening, and a claw tool having a central portion and a pair of opposing ends, the central portion having a fastener chamber for lockingly engaging a threaded fastener, the fastener chamber constructed and arranged so that the fastener may be pushed axially into the chamber and held there to secure the cover to the pole to cover the opening, and so that the fastener may be removed by unthreading.

In the preferred embodiment, the claw tool is provided with a claw formation at each of two opposing ends to engage side edges of the access opening in a secure manner. Each claw formation has a pair of legs, one leg disposed externally of the pole and the other internally within the pole. The rear leg preferably takes the form of a plurality of spaced, angled, flexible flaps.

BRIEF DESCRIPTION OF THE SEVERAL VIEWS OF THE DRAWINGS

FIG. 4 is an exploded perspective elevational view of the present claw tool equipped with an adapter clamp;

FIG. 5 is a partial cross-section similar to FIG. 3 showing the present claw tool used with an adapter clamp in a utility pole;

FIG. 6 is a partial cross-section similar to FIG. 5 depicting an alternate embodiment of the adapter clamp; and FIG. 7 is a perspective elevational view of an alternative embodiment of the present claw tool, with the edges of the access opening shown in phantom.

DETAILED DESCRIPTION OF THE INVENTION

Figure 1:
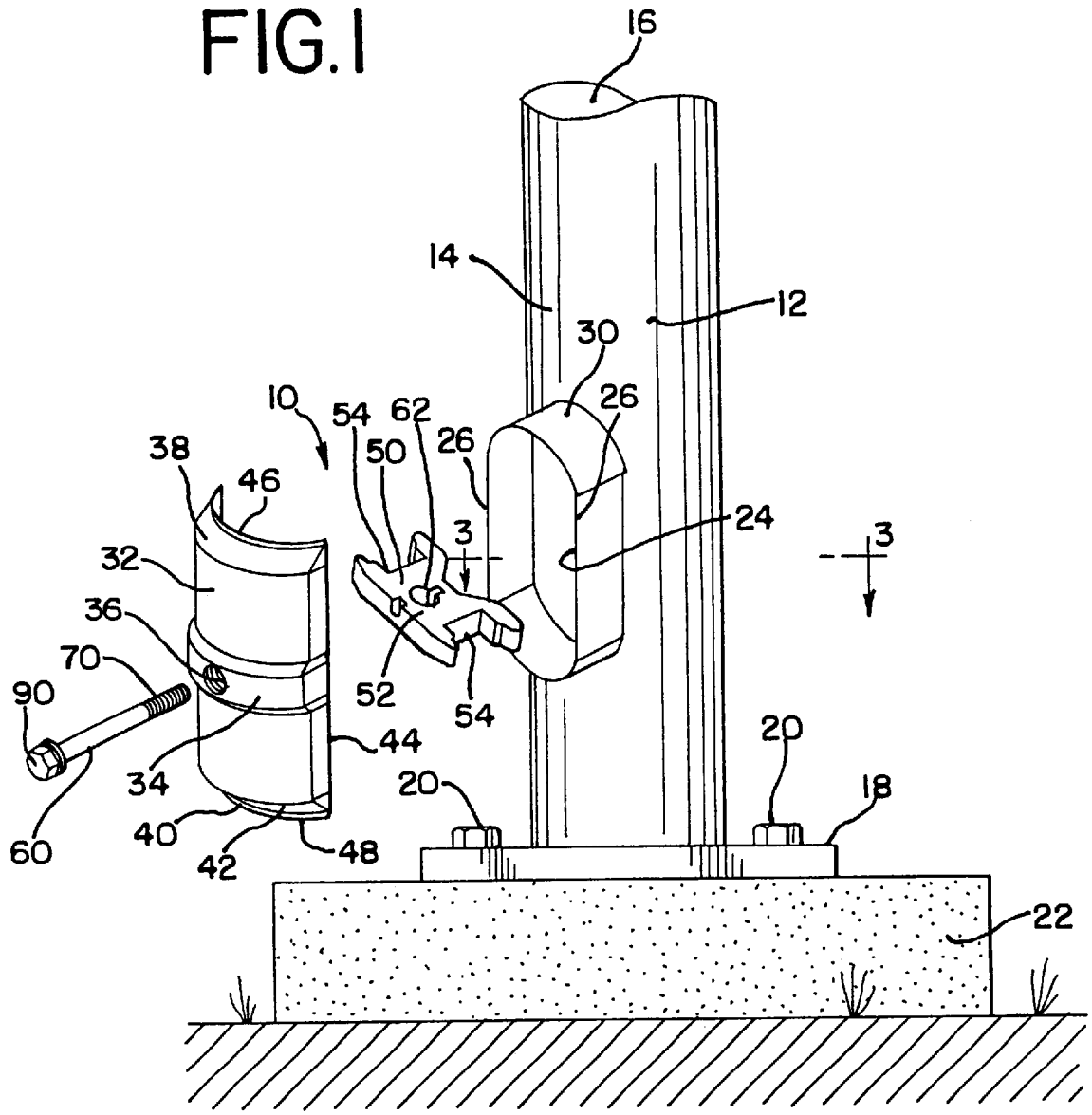
FIG. 1 is an exploded perspective elevational view of the present rapid attachment cover assembly shown in relation to a utility pole of the type suitable for accommodating the present assembly.
Figure 2:
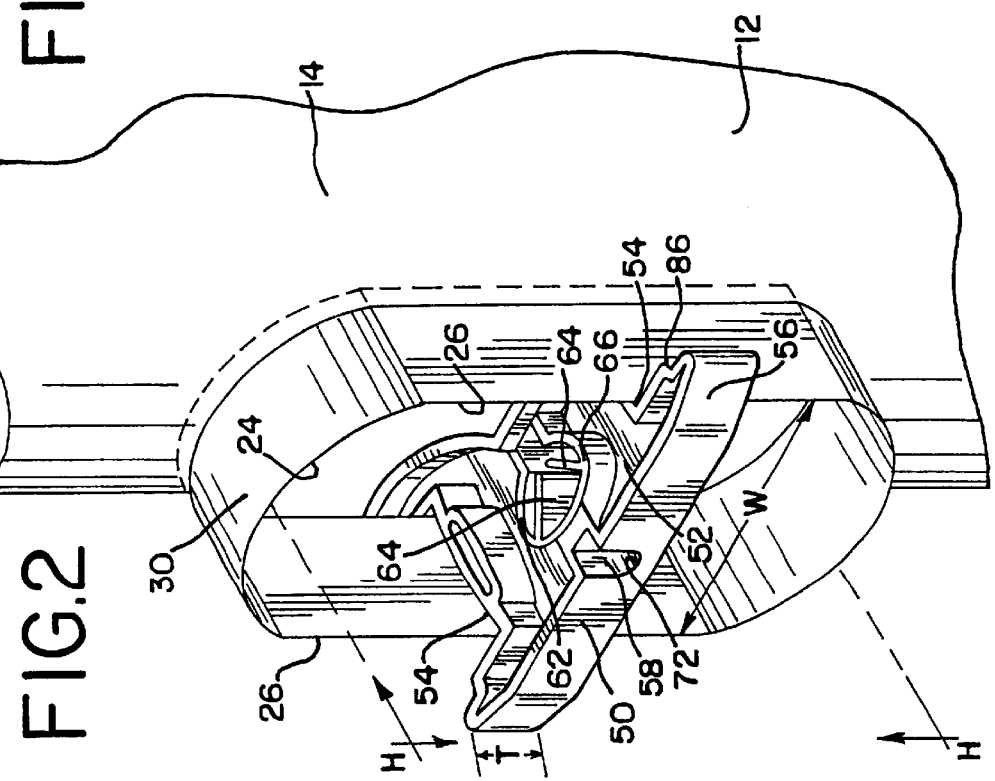
FIG. 2 is a fragmentary perspective elevation of the present claw tool installed in the access opening of a utility pole.

Referring now to FIGS. 1 and 2, the present rapid attachment cover for a utility pole access opening is depicted as an assembly which is generally designated 10. The present assembly 10 is designed for use as a replacement cover for a utility pole 12. Typically used for street lights, traffic signals and the like, the utility pole 12 is generally tubular and hollow, has an outer surface 14 and an inner surface 16. The pole 12 is preferably made of aluminum, however other metals, alloys and even concrete are contemplated. A base 18 of the pole is radially flanged to accommodate fasteners 20 such as bolts to secure the pole 12 to a concrete foundation 22.

An access opening 24 is located near the base of the pole and has a width W, a height H which is taller or longer than the width W, and a pair of side edges 26. In most cases, the overall shape of the opening 24 is oval or ellipsoid, but other shapes, including rectangular, are contemplated. In many cases, the access opening 24 is configured so that the side edges, as well as the entire periphery, are thickened in a radial direction from the center of the pole to accommodate an access cover and to reinforce the strength of the pole in this area. In some cases, the thickening takes the form of a radially extending peripheral flange (best seen in FIG. 2), and in other cases, the thickening takes the form of a bead or rib (best seen in FIG. 5).

Figure 3:
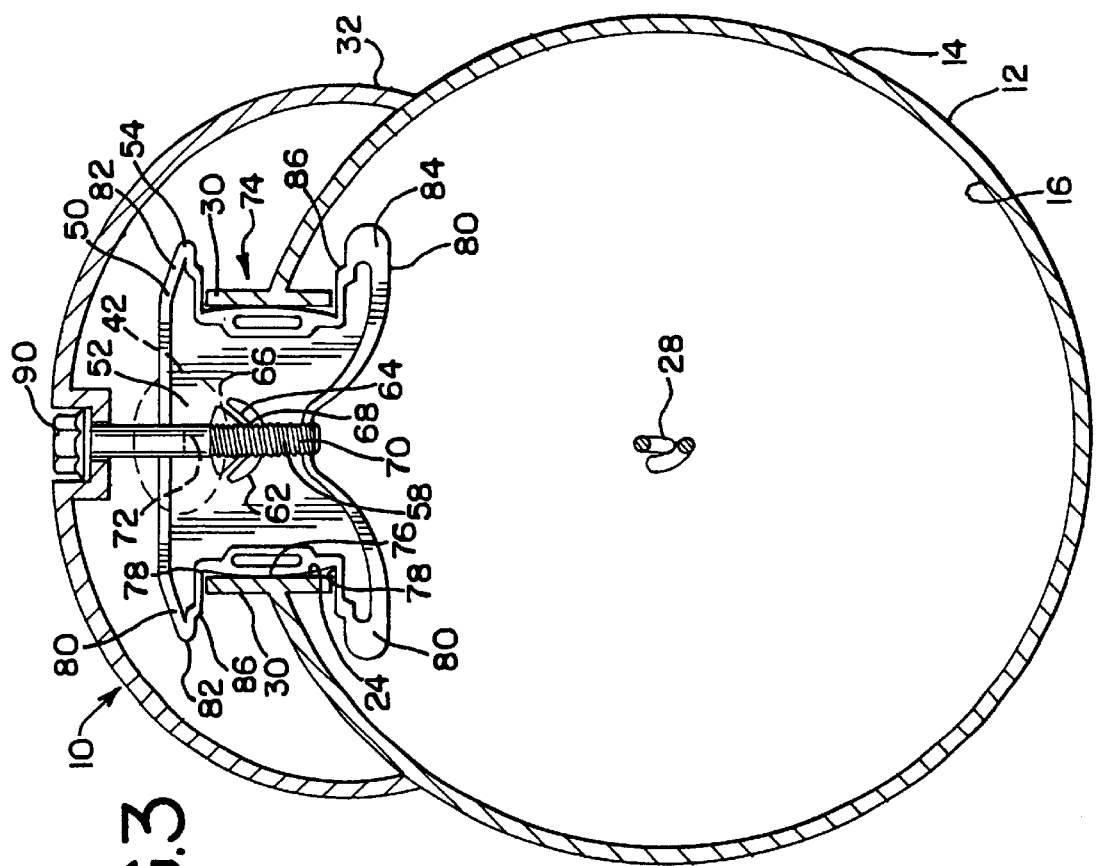
FIG. 3 is a cross-sectional view taken along the line 3—3 of FIG. 1 and in the direction generally indicated when the components are assembled.

As described in the background above, the original equipment access covers of such poles, typically made of aluminum, are often stolen for scrap value or to obtain access to power wires 28 which run inside the pole 12 (best seen in FIG. 3). The present rapid attachment cover 10 is intended for use with the pole 12 which is provided with the access opening periphery having a thickness which is greater than that of the surrounding material of the pole, and preferably is significantly thickened to form a peripheral flange 30.

Referring now to FIGS. 1–3, the present rapid attachment cover assembly 10 includes a cover 32 dimensioned to be larger in peripheral dimension than the access opening 24, as well as similar openings on differing models of utility poles made by a variety of manufacturers. The cover 32 is generally curved about its longitudinal axis to fit snugly against the outer surface 14 of the pole 12. A support band 34 preferably radially extends from the cover in a generally central location, and is provided with a central throughbore 36. In the preferred embodiment, the throughbore 36 is countersunk in the band 34. Respective upper and lower ends 38, 40 of the cover 32 are tapered for many reasons, including weather resistance, aesthetics and conservation of material. The cover 32 is made of rigid, weather-resistant plastic material such as ABS or equivalent engineered materials.

To prevent moisture from accumulating within the pole 12, the cover 32 is preferably provided with at least one air vent 42. In the preferred embodiment, a single vent 42 is located at the lower end 40 of the cover 32 to prevent the entry of rain and snow. However the number, shape and position of the vent 42 may vary depending on the application. Also included on the cover is a pair of longitudinal edges 44, an upper edge 46 and a lower edge 48, all of which are configured to snugly and uniformly engage the outer surface 14 of the pole 12.

Another component of the assembly 10, a claw tool 50 is preferably made of rigid, durable, non-conductive plastic material such as ABS or equivalent engineered material and has a central portion 52 and a pair of opposing ends 54. It is preferred that the claw tool 50 be injection molded, however other equivalent manufacturing techniques may be utilized as are known by skilled practitioners in the molding art. The central portion is generally planar, with a peripheral wall 56 extending normally to the plane defined by the central portion, and extending above and below that portion to give the central portion a height T. In addition, the central portion defines a fastener chamber 58 for lockingly engaging a threaded fastener 60, which is also included in the assembly 10.

An important feature of the present access opening cover assembly 10 is that the fastener chamber 58 is constructed and arranged so that the fastener 60 may be readily pushed axially into the chamber by the installer, that the fastener will be held there to secure the cover 32 to the pole to cover the opening, and so that the fastener may be removed by unthreading. More specifically, the fastener chamber 58 passes through the entire central portion 52 and includes an enlarged cutout 62 into which projects at least one tab 64 angled obliquely to a longitudinal axis of the chamber, which is the same as the axial orientation of the fastener 60 once it is inserted into the chamber (best seen in FIG. 3).

In the preferred embodiment, the cutout 62 is generally centrally located in the claw tool 50, and there are a pair of tabs 64, each oriented at an oblique, approximately 45° C. angle to the fastener to engage opposite sides of the fastener 60. It is contemplated that the number, shape and orientation of the tabs 64 may be varied to suit the application, and the present invention is not restricted to the specific orientation disclosed here. Each tab 64 has a first end 66 secured to the central portion, and a second end 68 which projects freely into the fastener chamber 58 to engage threads 70 of the fastener 60. The fastener chamber 58 also includes at least two half collar fastener support surfaces 72 for supporting the fastener 60 in position therein, as best seen in FIGS. 2 and 3.

Referring now to the ends 54 of the claw tool 50, each end is identical, so that only one will be described for the sake of simplicity. A claw formation 74 is provided at each end 54 for engaging a corresponding one of the side edges 26. Each claw formation 74 is generally "C"-shaped, with a base 76 having a length extending generally parallel to the axis of the fastener chamber 58, having two ends 78 and a pair of legs 80 projecting generally normally from the ends 78. As seen in FIG. 3, the base 76 is dimensioned to receive the side edge 26, and the legs are oriented so that the claw tool 50 is snugly secured in the access opening 24. More specifically, it is preferred that the length of the base 76 is at least as long as the thickness of the side edges, and further, that the base is slightly outwardly curved or convex to provide a tight friction fit between the claw tool 50 and the opening 24. A small nipple 77 (FIG. 4) or other formation may be added to the base 76 to provide a tighter fit when needed.

Also, it will be seen from FIG. 3 that the legs 80 include a front leg 82 disposed at a front end of the claw tool, and a rear leg 84 disposed at a rear end of the claw tool, wherein the rear leg is longer than the front leg. To make the claw tool 50 compatible with a wide range of utility pole access opening configurations, at least one of the legs 82, 84 in each claw formation 74 has at least one shoulder formation 86. The shoulder formations 86 create regions in the claw formation 74 of varying widths to receive side edges having a range of widths. Although only one shoulder formation 86 is depicted here on each claw formation 74, resulting in two different widths, it will be appreciated that the number, spacing and configuration of the shoulder formations may vary with the application.

An advantage of making the claw tool 50 out of non-conductive plastic relates to the fact that during installation, the installer often must push stray wires out of the way in the interior of the pole 12 to accommodate the claw tool. Since it is non-conductive, the claw tool 50 may be used to push the wires away without subjecting the installer to shock injury. The installer merely grasps one end 54 of the tool and pushes against the wires w with the opposite end. A related advantage relates to the feature of providing the fastener 60 in a non-conductive plastic material such as ABS, so that there will be no corrosion of the fastener which may impede its removal when necessary. However, it will be appreciated that with the cover 32 and the claw tool 50 made from plastic, the chances of corrosion interfering with even a metallic fastener are significantly reduced from the replacement covers of the prior art.

Perhaps a greater advantage of non-conductive fasteners is that, upon installation, a tip 88 of the fastener 60 will not cause a short circuit with any wires in the pole 12. Another advantage of the fastener 60 is that a head 90, located opposite the tip, although shown with a hex head, may be provided with a keyed or otherwise unconventionally shaped head (FIG. 6) to prevent the unauthorized removal of the cover 32 unless the removing party has the proper tool.

Referring now to FIGS. 4 and 5, an optional feature of the present assembly 10 is depicted, and is designed for use in utility poles 12*a* in which the access opening 24 is configured such that the claw formation 74 does not completely or positively engage the side edges 26 of the access opening 26. This is because the peripheral flange 30 is replaced with a peripheral weldment 91 in the shape of a bead, which does not extend the full width of the base 76. Instead, an adapter clamp 92 is mounted to the claw tool 50 so that a front edge 94 engages the inner surface 16 at at least two points.

To secure the adapter clamp 92 to the claw tool 50, at least one and preferably a pair of depending legs 96, which are integrally attached to the clamp, are inserted into corresponding mounting slots 98 located in the central portion 52. Each of the legs 96 is provided with a barb rib 100 which retains the mating engagement between the leg and the slot. The fastener 60 secures the cover 32 to the claw tool 50 in the same manner as described above in relation to FIGS. 1–3. However, as the cover 32 and the fastener 60 are pressed into the claw tool and against the outer surface 14 of the utility pole 12, the front edge 94 of the adapter clamp 92 is drawn against the inner surface of the utility pole as seen in FIG. 5.

Referring now to FIG. 6, an alternate embodiment of the adapter clamp of FIG. 5 is shown and generally designated 102. Components of the clamp 102 which are identical to the clamp 92 are designated with identical reference numerals. The main difference between the clamps 102 and 92 is that in the former, ends 104 of the clamp are provided with a plurality of somewhat flexible flaps 106 arranged in parallel, contacting relationship. Also, the flaps 106 vary in length and are progressively longer as they are farther from the access opening 24. Thus, a shortest flap 106*a* is closest to the access opening 24, and the longest flap 106*b* is farthest from the opening.

A main advantage of the clamp 102 is that it is compatible with a wider variety of utility pole configurations than the clamp 92. As the clamp 102 is tightened toward the opening 24, the flaps 106 will compress rearwardly against the next adjacent flap until the clamp, and the attached claw tool 50, is secured against the inner surface 16 of the utility pole 12. Thus, the ends 104 are deformable to the interior surface 16 of the pole 12.

Referring now to FIG. 7, another alternate embodiment of the present claw tool 50 is depicted and generally designated 110. Components of the claw tool 110 which are identical to those of the tool 50 are designated with identical reference numbers. The main distinctive features of the claw tool 110 include the configuration of the claw formation and the number of angled tabs 64.

More specifically, the claw tool 110 has a peripheral wall 56 which partially defines the front legs 82, which is configured to engage the outer surface 14 of the pole 12, similarly to the claw tool 50. In addition, each front leg 82 preferably has a shoulder 86 to increase the range of sizes of access openings in which the tool 110 may be used, and also to provide a more positive engagement with access openings which are sized so that the shoulder and the front leg engage the opening together.

The principal variation between the tool 50 and the tool 110 is that in the latter, the rear leg 84 has been changed in configuration from a single member to at least one, and preferably a plurality of deformable gripping flaps 112, which are configured for engaging the interior surface 16 of the pole 12. In the preferred form of this embodiment, the flaps 112 are provided in a parallel orientation to the other flaps, and each have a first end 114 and a second end 116. The first end 114 is integrally joined to a base 118 of the claw formation 120, which generally corresponds to the claw formation 74 of the claw tool 50. The second end 116 projects outwardly from the base 118.

It is preferred that the flaps 112 of each claw formation 120 are inclined toward the corresponding front leg 82. It is further preferred that a line formed by the second ends 116 does not extend laterally beyond an outer edge 122 of the front leg 82. To make the claw tool 10 capable of fitting in a wide variety of access openings, it is also contemplated that certain of the flaps 112 in a particular claw formation 120 will be longer than others. Specifically, in the illustrated embodiment, a first flap 124 located closest to the front leg 82 is longer than the remaining flaps. It has been found that this configuration is suitable for use in poles having wide, yet shallow access openings. In addition, it is contemplated that the flaps 112 have a height "h" which generally corresponds to the height of the claw tool 110, but may increase or decrease as needed.

The advantage of the plurality of inclined flaps 112 is that, once the claw tool 110 is inserted into the sidewalls 26 defining the access opening 24 (shown in phantom in FIG. 7), depending on the thickness of the periphery of the opening, one of the flaps will engage the inner surface 16. As the fastener 60 is tightened, and the cover 32 is tightened against the claw tool 110, the engaged flap 112 will splay out laterally slightly to exert a biasing force on the inside surface 16 of the pole 12. Depending on the thickness of the access opening 24, one or more of the flaps 112 may be pressed inwardly (toward the base 118) by the side edges 26.

Another feature of the claw tool 110 is that in a fastener chamber 128, which generally corresponds to the fastener chamber 58, a second pair of tabs 130 are provided, which are identical to the tabs 64 but placed in parallel relationship thereto. These extra tabs are provided for more securely retaining the fastener 60 upon insertion as described above. When the fastener needs to be removed, it can be unthreaded in the same manner as described in relation to the claw tool 50.

In operation, and referring to FIGS. 1–3 and 7, to install the replacement cover 10, the installer first places the claw tool 50, 110 in the access opening 24 so that the claw formations 74, 120 each tightly engage a corresponding side edge 26. Thus, the claw tool 50, 110 is held midway between upper and lower ends of the opening 24. Next, the fastener 60 is inserted through the throughbore 36, and the cover 32 and the fastener are placed in operational relationship to the claw tool 50, 110 so that the tip 88 of the fastener 60 may be inserted into the fastener chamber 58, 128. Once inserted, the installer merely presses against the fastener and the cover until the cover abuts the outer surface 14 of the pole 12. At the same time, the threads 70 of the fastener 60 are engaged by the free ends 68 of the tabs 64, 130. This engagement positively secures the fastener 60 in the claw tool 50, 110 and assembly may be accomplished without the use of tools. The fastener can only be removed by unthreading. In addition, the claw tool 110 offers the advantage of being adaptable to a wider range of sizes and configurations of access apertures 24.

It will be seen that the present rapid attachment cover for utility pole access opening provides a system which is easier to assemble, safer to use and which prevents corrosion of the utility pole, when compared to conventional replacement utility pole access opening covers. Also, use of the present adapter clamps enables the present assembly to be used on a wider variety of utility pole access opening configurations.

While a particular embodiment of the rapid attachment cover for utility pole access opening of the invention has been shown and described, it will be appreciated by those skilled in the art that changes and modifications may be made thereto without departing from the invention in its broader aspects and as set forth in the following claims.

What is claimed is:

1. A claw tool for use in an access cover assembly designed for removably covering an access opening of a utility pole, the opening having a width, a height which is longer than the width and a pair of side edges, the side edges having a thickness, said claw tool comprising:

a central portion and a pair of opposing ends, each said end having a claw formation for engaging a corresponding one of the side edges, said central portion having a fastener chamber for lockingly engaging a threaded fastener, said fastener chamber constructed and arranged so that the fastener may be pushed axially into said chamber and held there to secure said cover to the pole to cover the opening, and so that the fastener may be removed by unthreading; and each said claw formation having a front leg configured for engaging an outer surface of the pole adjacent the opening, and a rear leg configured for engaging an inner surface of the pole adjacent the opening.

2. The claw tool as defined in claim 1 wherein at least one of said front and rear legs is provided with at least one shoulder.

3. The claw tool as defined in claim 1 wherein said rear leg is provided in the form of at least one deformable flap.

4. The claw tool as defined in claim 3 wherein each said flap is inclined toward said front leg.

5. The claw tool as defined in claim 3 wherein at least one of said flaps has a length which is longer than adjacent flaps.

6. The claw tool as defined in claim 1 wherein said fastener chamber includes at least one tab angled obliquely to a longitudinal axis of said chamber.

7. The claw tool as defined in claim 6 wherein said at least one tab is secured to said central portion at a first end, and projects freely into said chamber at a second end, said second end being disposed in said chamber to engage the fastener.

* * * * *